United States Patent
Boerlage et al.

(10) Patent No.: US 10,233,771 B2
(45) Date of Patent: Mar. 19, 2019

(54) SYSTEM AND METHOD FOR PREVENTING AN EMERGENCY OVER-SPEED CONDITION IN A ROTATING MACHINE

(71) Applicant: General Electric Company, Schenectady, NY (US)

(72) Inventors: Matthijs Leonardus Gerardus Boerlage, Greenville, SC (US); Frederick William Block, Campobello, SC (US); William Forrester Seely, Greenville, SC (US)

(73) Assignee: General Electric Company, Schenectady, NY (US)

( * ) Notice: Subject to any disclaimer, the term of this patent is extended or adjusted under 35 U.S.C. 154(b) by 167 days.

(21) Appl. No.: 14/097,958

(22) Filed: Dec. 5, 2013

(65) Prior Publication Data
US 2015/0159504 A1   Jun. 11, 2015

(51) Int. Cl.
*F01D 21/02* (2006.01)
*G05D 13/04* (2006.01)
(Continued)

(52) U.S. Cl.
CPC ........... *F01D 21/02* (2013.01); *F01D 21/003* (2013.01); *F01D 21/14* (2013.01); *F02C 9/28* (2013.01); *G05D 13/04* (2013.01); *F05B 2270/1011* (2013.01); *F05B 2270/1021* (2013.01); *F05B 2270/304* (2013.01); *F05D 2270/021* (2013.01); *F05D 2270/04* (2013.01); (Continued)

(58) Field of Classification Search
CPC .............. F01D 21/02; F05D 2270/021; F05D 2270/04; G05D 13/04; F05B 2270/1011; F05B 2270/10212; F05B 2270/1021
See application file for complete search history.

(56) References Cited

U.S. PATENT DOCUMENTS 3,614,457 A * 10/1971 Eggenberger ........... F01D 17/26
290/40 R
3,998,047 A    12/1976 Walker
(Continued)

FOREIGN PATENT DOCUMENTS

CN    102322356 A    1/2012
CN    103174523 A    6/2013
(Continued)

OTHER PUBLICATIONS

English machine translation of JP 2003-232231 A.*
(Continued)

*Primary Examiner* — Scott J Walthour
(74) *Attorney, Agent, or Firm* — Fletcher Yoder, P.C.

(57) ABSTRACT

In accordance with one aspect of the present technique a method includes receiving at least one of a speed and an acceleration of a rotating component in a rotating machine. The method includes determining whether at least one of the speed and the acceleration of the rotating component exceeds a non-trip operating (NTO) space in a speed-acceleration plane, wherein the NTO space is based on a trip overshoot model. The method further includes sending a notification for tripping the rotating machine in response to determining that at least one of the speed and the acceleration of the rotating component exceeds the NTO space.

15 Claims, 5 Drawing Sheets

(51) Int. Cl.
  *F01D 21/14* (2006.01)
  *F02C 9/28* (2006.01)
  *F01D 21/00* (2006.01)

(52) U.S. Cl.
  CPC .... *F05D 2270/042* (2013.01); *F05D 2270/09* (2013.01); *F05D 2270/304* (2013.01)

(56) References Cited

U.S. PATENT DOCUMENTS

| | | | |
|---|---|---|---|
| 4,218,879 | A | 8/1980 | Hagrman et al. |
| 4,474,013 | A | 10/1984 | Chamberlain |
| 4,578,945 | A | 4/1986 | Peck et al. |
| 6,321,525 | B1 | 11/2001 | Rogers |
| 6,619,027 | B1 | 9/2003 | Busch |
| 7,194,865 | B2 | 3/2007 | Drob |
| 8,246,294 | B2 | 8/2012 | Rosenfield |
| 8,321,119 | B2 | 11/2012 | Van et al. |
| 2007/0013365 | A1 | 1/2007 | Jones |
| 2010/0250051 | A1* | 9/2010 | Nestico ............... F02C 9/28 701/31.4 |
| 2013/0259686 | A1 | 10/2013 | Blom et al. |

FOREIGN PATENT DOCUMENTS

| | | |
|---|---|---|
| EP | 1870565 A1 | 12/2007 |
| JP | 2003232231 A * | 8/2003 |
| WO | 2012/095111 A1 | 7/2012 |

OTHER PUBLICATIONS

"Newton's Second Law for Rotations". https://ccrma.stanford.edu/~jos/pasp/Newton_s_Second_Law_Rotations.html. accessed May 13, 2017.*

European Search Report and Opinion issued in connection with corresponding EP Application No. 14195116 dated Apr. 22, 2015.

Taylor et al., "Turbine Overspeed Systems and Required Response Times", Proceedings of the Thirty-Eighth Turbomachinery Symposium, 2009, pp. 157-167.

Fischer, "Reducing rotor speed variations of floating wind turbines by compensation of non-minimum phase zeros", Renewable Power Generation, IET, vol. 7, Issue: 4, Jul. 2013.

First Office Action and Search issued in connection with corresponding CN Application No. 201410730981.5 dated Apr. 3, 2018.

* cited by examiner

SYSTEM AND METHOD FOR PREVENTING AN EMERGENCY OVER-SPEED CONDITION IN A ROTATING MACHINE

BACKGROUND

The subject matter disclosed herein generally relates to preventing an emergency over-speed condition in a rotating machine. More specifically, the subject matter relates to a system and method for preventing an emergency over-speed condition in a rotating machine based on a trip overshoot model of the rotating machine.

Rotating machines, for example, gas turbines, steam turbines, wind turbines, and the like, often encounter an emergency over-speed condition due to a loss of counter-load and a delayed cut-off in the energy supply to the rotating component. In such emergency over-speed conditions, the rotating component, such as the turbine rotor, accelerates and reaches rotational speeds beyond its specifications or physical limits. The rotational speed beyond the typical operating parameters can lead to inefficiency, increased maintenance, system failure and possible damage to the equipment or personnel.

Existing methods of preventing such emergency over-speed conditions include setting a speed limit and tripping the rotating machine, if the rotating component exceeds the defined speed limit. Such methods have numerous problems, for example, if the speed limit is set too high, even if the gas turbine (i.e., rotating machine) is tripped, the rotors (i.e., rotating component) may overshoot and reach the emergency over-speed condition due to fuel remaining in the supply lines of the gas turbine. In another example, if the speed limit is set too low, the gas turbine may be tripped even if the rotors might not have reached the emergency over-speed condition. Such false tripping is disadvantageous as it leads to energy losses in the gas turbine, increased down-time, and costly maintenance.

Thus, there is a need for an enhanced system and method for preventing an emergency over-speed condition in rotating machines.

BRIEF DESCRIPTION

In accordance with one aspect of the present technique a method includes receiving at least one of a speed and an acceleration of a rotating component in a rotating machine. The method includes determining whether at least one of the speed and the acceleration of the rotating component exceeds a non-trip operating (NTO) space in a speed-acceleration plane, wherein the NTO space is based on a trip overshoot model. The method further includes sending a notification for tripping the rotating machine in response to determining that at least one of the speed and the acceleration of the rotating component exceeds the NTO space.

In accordance with one aspect of the present systems, a system includes a communication module configured to receive at least one of a speed and an acceleration of a rotating component in a rotating machine. The system also includes a determination module configured to determine whether at least one of the speed and the acceleration of the rotating component exceeds a non-trip operating (NTO) space in a speed-acceleration plane, wherein the NTO space is based on a trip overshoot model. The system further includes a notification module configured to send a notification for tripping the rotating machine in response to determining that at least one of the speed and the acceleration of the rotating component exceeds the NTO space.

In accordance with one aspect of the present technique, a computer program product encoding instructions is disclosed. The instructions when executed by a processor, causes the processor to receive at least one of a speed and an acceleration of a rotating component in the rotating machine. The instructions further cause the processor to determine whether at least one of the speed and the acceleration of the rotating component exceeds a non-trip operating (NTO) space in a speed-acceleration plane, wherein the NTO space is based on a trip overshoot model. The instructions further cause the processor to send a notification for tripping the rotating machine in response to determining that at least one of the speed and the acceleration of the rotating component exceeds the NTO space.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and may include any computer program stored in a memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Approximating language, as used herein throughout the description and claims, may be applied to modify any quantitative representation that could permissibly vary without resulting in a change in the basic function to which it is related. Accordingly, a value modified by a term or terms, such as "about" and "substantially", are not limited to the precise value specified. In at least some instances, the approximating language may correspond to the precision of an instrument for measuring the value. Here and throughout the specification and claims, range limitations may be combined and/or inter-changed, such ranges are identified and include all the sub-ranges contained therein unless context or language indicates otherwise.

Figure 1:
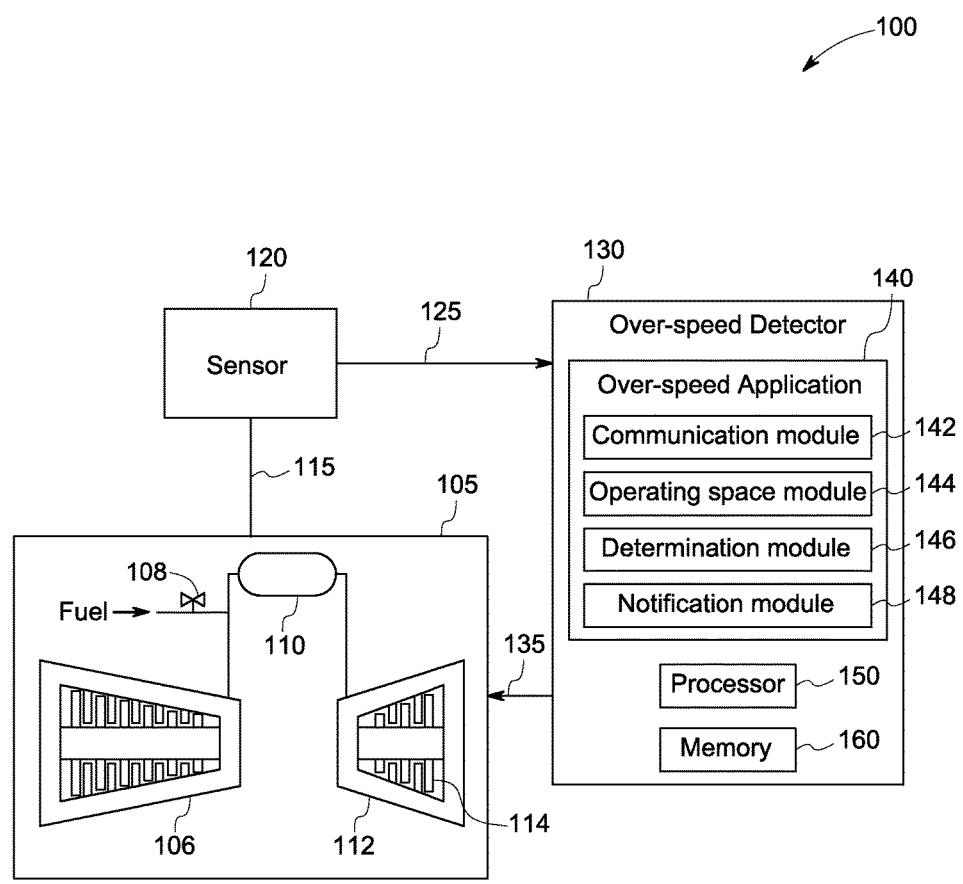
FIG. 1 is a block diagram illustrating a system for preventing an emergency over-speed condition in a rotating machine according to one embodiment.

A system and method for preventing an emergency over-speed condition in a rotating machine is described. FIG. 1 illustrates a system 100 for preventing an emergency over-speed condition in a rotating machine according to one embodiment. The system 100 includes a rotating machine 105, a sensor 120, and an over-speed detector 130. In the illustrated embodiment, the rotating machine 105 is coupled to the sensor 120 and the over-speed detector 130 via signal lines 115 and 135 respectively. Similarly, the sensor 120 is communicatively coupled to the over-speed detector 130 via a signal line 125. Although in the illustrated embodiment, one rotating machine 105, one sensor 120, and one over-speed detector 130 are illustrated in FIG. 1, in other embodiments, any number of rotating machines 105, sensors 120, and over-speed detectors 130 may be communicatively coupled to each other. Although in the illustrated embodiment, the rotating machine 105, the sensor 120, and the over-speed detector 130 are coupled via signal lines 115, 125, and 135, in other embodiments, the devices can be coupled wirelessly via a network (not shown). In such embodiments, the system 100 may further include transceivers, centralized servers, cloud storage or the like, for communicating information.

In the illustrated embodiment, the rotating machine 105 is a combustion turbine system (e.g., a gas turbine engine, an aircraft engine, and the like) that includes a compressor 106, a combustor 110, and a turbine 112. The turbine 112 is coupled to a load, for example, a generator (not shown) for generating electricity. During operation, air entering into the combustion turbine system 105, is compressed by the compressor 106 and is then channeled to the combustor 110. The combustor 110 receives fuel from a fuel source (not shown) and mixes the fuel and air to ignite the mixture and generate a hot combustion gas. The amount of fuel entering the combustor 110 is typically controlled via a regulator or fuel valve 108. The combustion gas is channeled to the turbine 112 and expanded to impart rotations on a rotating component, i.e., the rotors 114 in the turbine 112. The rotation of the rotors 114 causes the generator (not shown) to, for example, generate electric power. It should be noted herein that the terms "rotor" and "rotating component" may be used interchangeably.

Typically, an emergency over-speed condition of the rotating machine 105 is a situation where there is a loss of counter-load on the rotors 114, due to, for example, a lack of connection with the generator (not shown) and an inability to stop the fuel supply to the combustor 110. In such a situation, the rotating component, i.e., the rotors 114 accelerate and reach speeds beyond their physical limits or design specifications. The inability to stop/decrease the fuel supply to the combustor 110 may be due to, for example, a non-operational fuel valve 108, large amounts of fuel remaining in the combustor 110 after shutting the fuel valve 108, and the like. Although the rotating machine 105 is described herein as a combustion turbine system according to one embodiment, in other embodiments, the rotating machine 105 may include other systems (e.g., steam turbine, wind turbine, and the like) that encounter emergency over-speed conditions due to a loss in counter-load and a delayed cut off in the energy supply to the rotating component 114. For example, the rotors of steam turbine may accelerate and reach an emergency over-speed condition due to a loss of counter-load and an inability to stop the steam from causing the rotors to rotate. In another example, the blades of a wind turbine may accelerate and reach an emergency over-speed condition due to a loss of counter-load and an inability to stop the wind from causing the blades to rotate.

The sensor 120 is any type of device that is configured to measure at least one of a speed and an acceleration of the rotating component 114 in the rotating machine 105. The sensor 120 may include, for example, a speed ring that is configured to count the number of rotations of the rotating component 114, a motion sensor, a speedometer, and the like. The sensor 120 is further configured to send the measured speed and/or acceleration of the rotating component 114 to the over-speed detector 130 or to a device that is configured to transmit such information (not shown).

The over-speed detector 130 is a device that is configured to receive at least one of the speed and the acceleration of the rotating component 114 and detect an emergency over-speed condition of the rotating machine 105. In the illustrated embodiment, the over-speed detector 130 includes an over-speed application 140, at least one processor 150, and at least one memory 160. The over-speed application 140 includes a communication module 142, an operating space module 144, a determination module 146, and a notification module 148. The plurality of modules of the over-speed application 140, the processor 150, and the memory 160 may be coupled to a bus (not shown) for communication with each other.

The processor 150 may include an arithmetic logic unit, a microprocessor, a microcontroller, general purpose controller or other processor arrays to perform computations, and transmit/retrieve data in the memory 160. In another embodiment, the processor 150 is a multiple core processor. The processor 150 processes data signals and may include various computing architectures including a complex instruction set computer (CISC) architecture, a reduced instruction set computer (RISC) architecture, or an architecture implementing a combination of instruction sets. The processing capability of the processor 150 may be limited to supporting the retrieval of data and transmission of data. The processing capability of the processor 150 may also perform more complex tasks, including various types of modulating, encoding, and multiplexing. In other embodiments, other processors, operating systems, and physical configurations are within the scope of the system.

The memory 160 may be a non-transitory storage medium. For example, the memory 160 may be a dynamic random access memory (DRAM) device, a static random access memory (SRAM) device, flash memory, or other memory devices. In one embodiment, the memory 160 also includes a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices.

The memory 160 stores data that is required for the over-speed application 140 to perform associated functions. In one embodiment, the memory 160 stores the modules (e.g., the communication module 142, the determination module 146, and the like) of the over-speed application 140. In another embodiment, the memory 160 stores a design speed limit of the rotating component 114, a maximum acceleration threshold, and a maximum speed threshold for low acceleration that are defined by, for example, an administrator of the over-speed detector 130 based on physical and legal restrictions of the rotating machine 105 and prior field data obtained by operating the rotating machine 105. The above mentioned thresholds and the design speed limit of the rotating component 114 are described below in further detail with reference to the operating space module 144.

The communication module 142 includes codes and routines configured to handle communications between the sensor 120, the rotating machine 105, and the other modules of the over-speed application 140. In one embodiment, the communication module 142 includes a set of instructions executable by the processor 150 to provide the functionality for handling communications between the sensor 120, the rotating machine 105, and the other modules of the over-speed application 140. In another embodiment, the communication module 142 is stored in the memory 160 and is accessible and executable by the processor 150. In either embodiment, the communication module 142 is adapted for communication and cooperation with the processor 150 and other modules of the over-speed application 140.

In one embodiment, the communication module 142 receives the speed and the acceleration of the rotating component 114 of the rotating machine 105, from the sensor 120. For example, the communication module 142 receives the speed and acceleration of the rotating component 114 in real-time or at certain time intervals. In another example, the communication module 142 receives the speed and the acceleration of the rotating component 114 in response to sending a request to the sensor 120. Although the communication module 142 is described as receiving both speed and acceleration of the rotating component 114 according to one embodiment, in other embodiments, the communication module 142 may receive the speed and calculate the acceleration or receive the acceleration and calculate the speed. For example, the communication module 142 receives the acceleration of the rotating component 114 and calculates the speed of the rotating component 114 based on the received acceleration and initial velocity of the rotating component 114 and timing measurements (i.e., Newton's law). In a further example, the communication module 114 may also estimate the initial velocity of the rotating component 114. In another example, the communication module 142 calculates the speed of the rotating component 114 based on torque measurements received from the sensor 120 which may be mapped to the acceleration of the rotating component 114.

The communication module 142 then sends the speed and acceleration of the rotating component 114 to the determination module 146. In another embodiment, the communication module 142 receives a notification for tripping the rotating machine 105 from the notification module 148. In such an embodiment, the communication module 142 sends the notification to the rotating machine 105.

The operating space module 144 includes codes and routines configured to determine a non-trip operating (NTO) space for the rotating machine 105. The NTO space is defined by a boundary (i.e., one or more curves) on a speed-acceleration plane that is representative of a maximum speed and acceleration for preventing the rotating component 114 from exceeding the design speed limit and reaching an emergency over-speed condition. In one embodiment, the operating space module 144 includes a set of instructions executable by the processor 150 to provide the functionality for determining the NTO space for the rotating machine 105. In another embodiment, the operating space module 144 is stored in the memory 160 and is accessible and executable by the processor 150. In either embodiment, the operating space module 144 is adapted for communication and cooperation with the processor 150 and other modules of the over-speed application 140.

Figure 2:
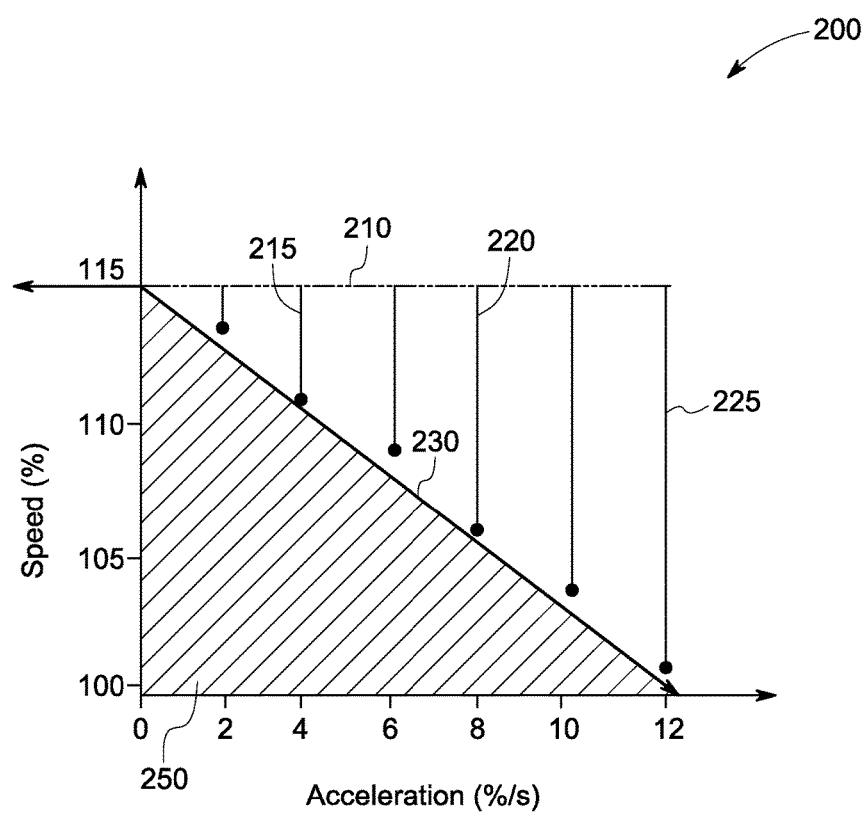
FIG. 2 is a graph illustrating a method for determining a non-trip operating space for a rotating component in the rotating machine according to one embodiment.

FIG. 2 is a graph 200 illustrating a method for determining the NTO space for the rotating component 114 in the rotating machine 105 according to the embodiment of FIG. 1. The graph 200 illustrates a speed-acceleration plane in which the y-axis is representative of the speed of the rotating component 114 in percentages and the x-axis is representative of the acceleration of the rotating component 114 in percentage per second. The operating space module 144 retrieves the design speed limit 210 for the rotating component 114 from the memory 160. As mentioned above, the design speed limit 210 for the rotating component 114 is defined by, for example, an administrator of the over-speed detector 130 based on physical and legal restrictions for operating the rotating machine 105.

The operating space module 144 calculates one or more overshoot values of the rotating component 114 corresponding to one or more acceleration values. An overshoot value is the amount of additional speed that the rotating component 114 would reach depending on the speed and acceleration of the rotating component 114 at which the rotating machine 105 is tripped. In one embodiment, the operating space module 144 calculates the one or more overshoot values based on a trip overshoot model of the rotating machine 105. The trip overshoot model of the rotating machine 105 is, for example, defined by one or more differential equations that predict the behavior of the rotating component 114 after tripping the rotating machine 105. The trip overshoot model of the rotating machine 105 (i.e., the combustion turbine) is based on, for example, an inertia of the rotating component 114 (i.e., the rotor), a response time of the fuel valve 108, a fuel volume remaining in the combustor 110, a component efficiency of the rotating machine (i.e., the efficiencies of the compressor 106, the combustor 110, and the gas turbine 112), and the like.

In one embodiment, the trip overshoot model of the rotating machine 105 includes a black box model based on experimental data and/or simulation data collected using, for example, regression analysis, non-parametric frequency response analysis, and the like. In another embodiment, the trip overshoot model of the rotating machine 105 includes a white box model based on the laws of physics (e.g., Newton's law of inertia) that predict the behavior of the rotating component 114. In yet another embodiment, the trip overshoot model of the rotating machine 105 includes a grey box model, (i.e., a combination of the black box and the white box model), for example, a state space model of a gas turbine's 105 dynamic response, wherein the coefficients are chosen to make the predicted behavior of the rotating component fit the experimental and/or simulated data. In yet another embodiment, the trip overshoot model of the rotating machine 105 includes predictive algorithms, for example, model predictive controls, kalman filtering, regressive analysis, least square methods, recursive solvers of differential equations, adaptive controls, learning controls, neural networks, and the like.

In the illustrated example, if the rotating machine 105 is tripped when the rotating component 114 is at a speed of 110% and an acceleration of 4%/sec, the operating space module 144, based on the trip overshoot model, calculates that the rotating component 114 would reach an additional speed of (i.e., the overshoot value) 5% (See, 215). Similarly, the operating space module 144 calculates the overshoot value as 10% (See, 220), if the rotating machine 105 is tripped when the rotating component 114 is at a speed of 105% and an acceleration of 8%/sec. Similarly, the operating space module 144 calculates the overshoot value as 15% (See, 225), if the rotating machine 105 is tripped when the rotating component 114 is at a speed of 100% and an acceleration of 12%/sec. The operating space module 144 then determines a boundary that represents the NTO space based on the design speed limit and the one or more overshoot values. In the illustrated embodiment, the operating space module 144 determines the boundary 230 representative of the NTO space 250 by subtracting the one or more overshoot values 215, 220, and 225 from the design speed limit 210.

Figure 3:
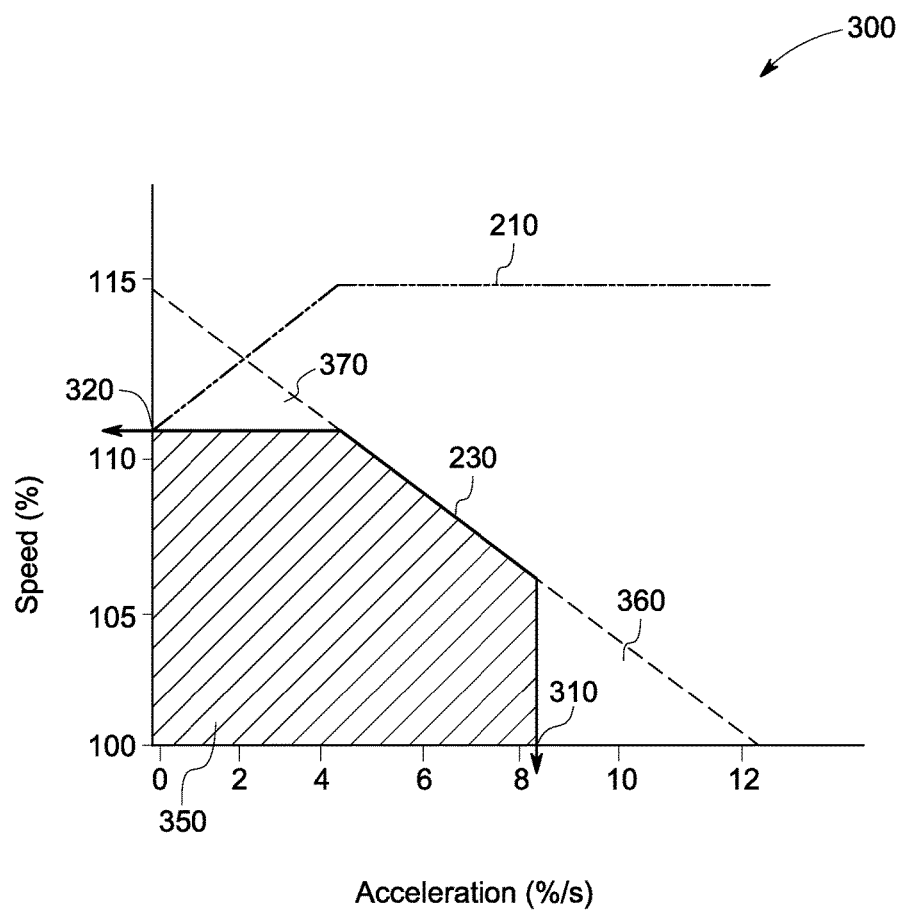
FIG. 3 is a graph illustrating a method for determining a non-trip operating space for the rotating component in the rotating machine according to another embodiment.

FIG. 3 is a graph 300 illustrating another method for determining the NTO space for the rotating component 114 in the rotating machine 105 according to the embodiment of FIG. 1. The graph 300 illustrates a speed-acceleration plane in which the y-axis is representative of the speed of the rotating component 114 in percentages and the x-axis representative of the acceleration of the rotating component 114 in percentage per second. Similar to the embodiment illustrated in FIG. 2, the operating space module 144 determines the boundary 230 based on the design speed limit 210 and one or more overshoot values. In the illustrated embodiment of FIG. 3, the operating space module 144 further determines the NTO space 350 based on a maximum acceleration threshold 310 and a maximum speed threshold 320 for low acceleration.

As mentioned above, the maximum acceleration threshold 310 and a maximum speed threshold 320 for low acceleration is defined by, for example, an administrator of the over-speed detector 130 based on prior field data obtained from operating the rotating machine 105. In the illustrated example, the administrator of the over-speed detector 130 defines the maximum acceleration threshold as 8%/sec since the prior field data of the rotating machine 105 indicates that the rotating component 114 has never exceeded an acceleration of 8%/sec. The administrator of the over-speed detector 130 also defines the maximum speed threshold as 110% for any acceleration value between 0-4%/sec (i.e., low acceleration) based on the prior field data of the rotating machine 105. In such an example, the prior field data indicates that when the speed of the rotating component 114 is above 110% for low acceleration values, tripping the rotating machine 105 has always resulted in the rotating component 114 reaching an emergency over-speed condition due to faults in the fuel valve 108.

For the purpose of clarity and convenience, the region beyond the maximum acceleration threshold 310 that is encompassed by the boundary 230 in the speed-acceleration plane 300, is referred to herein, as the maximum acceleration space 360. Similarly, for the purpose of clarity and convenience, the region beyond maximum speed threshold 320 for low acceleration that is encompassed by the boundary 230 in the speed-acceleration plane 300, is referred to herein, as the maximum speed space 370. The maximum speed space 370 and the maximum acceleration space 360 are described below in further detail with reference to the determination module 146 and the notification module 148.

Although in the embodiments illustrated in FIG. 2 and FIG. 3, the operating space module 144 determines the boundary 230 that is representative of the NTO spaces 250 and 350, as a linear curve, in other embodiments the operating space module 144 may determine the boundary 230 as a non-linear curve. The above described methods of determining the NTO spaces 250 and 350 based on the design limit speed 210 and the one or more overshoot values 215, 220, and 225 is advantageous. This is because if the rotating machine 105 is tripped due to the received speed and/or acceleration of the rotating component 114 exceeding the NTO spaces 250 and 350, the speed of the rotating component 114 would not overshoot beyond the design speed limit 210.

Referring back to FIG. 1, the determination module 146 includes codes and routines configured to detect an emergency over-speed condition in the rotating machine 105. In one embodiment, the determination module 146 includes a set of instructions executable by the processor 150 to provide the functionality for detecting an emergency over-speed condition in the rotating machine 105. In another embodiment, the determination module 146 is stored in the memory 160 and is accessible and executable by the processor 150. In either embodiment, the determination module 146 is adapted for communication and cooperation with the processor 150 and other modules of the over-speed application 140.

In one embodiment, the determination module 146 receives the speed and the acceleration of the rotating component 114 from the communication module 142. The determination module 146 further receives the NTO space of the rotating machine 105 from the operating space module 144. The determination module 146 detects an emergency over-speed condition in the rotating machine 105 by determining whether at least one of the received speed and acceleration of the rotating component 114 exceeds the NTO space. If the received speed and/or acceleration exceed the NTO space, the determination module 146 sends a message to the notification module 148 for tripping the rotating machine 105.

In a further embodiment, the determination module 146 determines whether the received speed and acceleration of the rotating component 114 is within the maximum speed space 370 (See, FIG. 3) or the maximum acceleration space 360 (See, FIG. 3). In such an embodiment, the message sent by the determination module 146 to the notification module 148 further includes information that the speed and acceleration of the rotating component 114 is within one of the above mentioned spaces.

The notification module 148 includes codes and routines configured to send a notification to the rotating machine 105. In one embodiment, the notification module 148 includes a set of instructions executable by the processor 150 to provide the functionality for sending a notification to the rotating machine 105 or to an operator/control room. In another embodiment, the notification module 148 is stored in the memory 160 and is accessible and executable by the processor 150. In either embodiment, the notification module 148 is adapted for communication and cooperation with the processor 150 and other modules of the over-speed application 140.

The notification module 148 receives a message from the determination module 146 indicating that the received speed and/or acceleration exceeds the NTO space and sends a notification to the rotating machine 105 via the signal line 135. In one embodiment, the notification includes an instruction for tripping the rotating machine 105 in order to prevent the speed of rotating component 114 from reaching an emergency over-speed condition. For example, the notification includes an instruction for stopping/shutting down the operation of the gas turbine 105 by, for example, closing all the fuel valves 108 and moving all actuators (not shown) of the gas turbine 105 to a safe position. In a further embodiment, in addition to the tripping instruction, the notification module 148 also generates graphical data for providing a user interface to, for example, an operator of the rotating machine 105. In such an embodiment, the notification module 148 sends the notification to a display device (not shown) coupled to the rotating machine 105. The display device (not shown) renders the graphical data and displays the user interface. For example, the determination module 146 determines that the received speed and acceleration of the rotating component 114 exceeds the NTO space and are within the maximum speed space 370 (See, FIG. 3). In such an example, the notification sends graphical data for displaying an alert that includes "Rotating machine has been tripped. Check the fuel valves."

Figure 4:
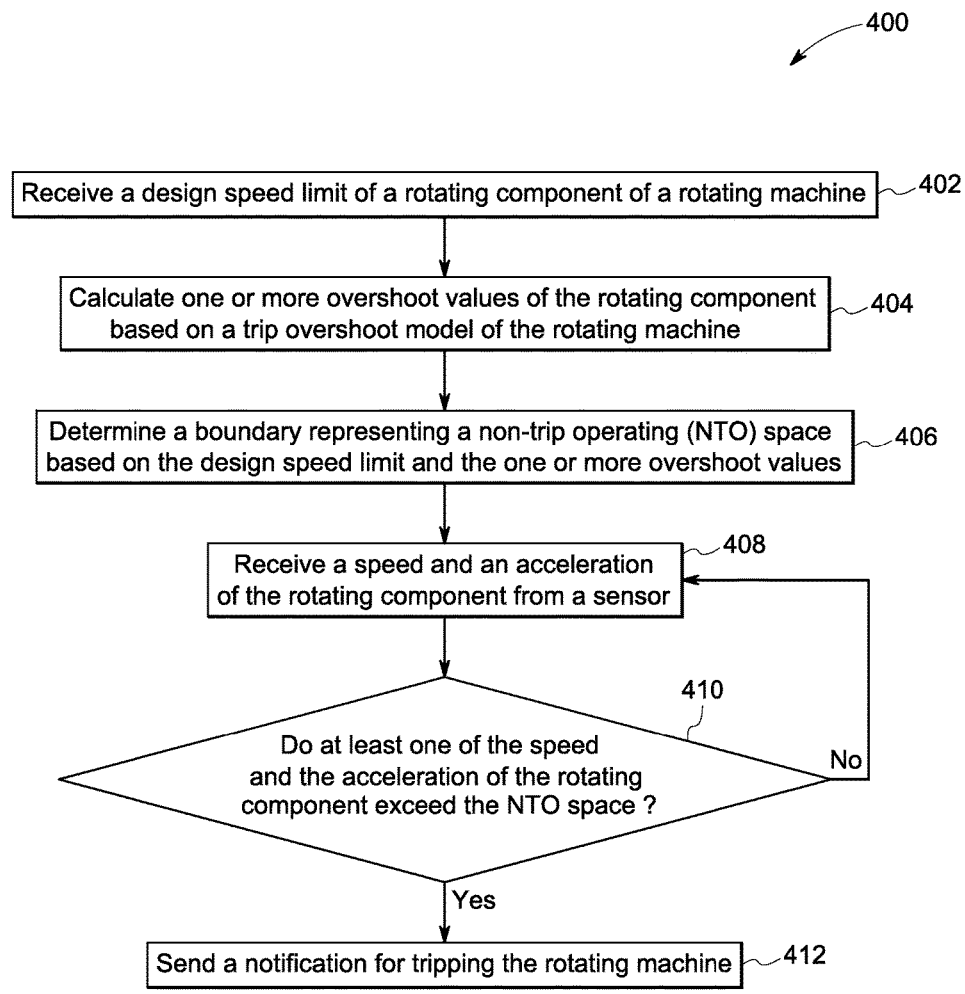
FIG. 4 is a flow diagram illustrating a method for preventing an emergency over-speed condition in the rotating machine according to one embodiment.

FIG. 4 is a flow diagram 400 illustrating a method for preventing an emergency over-speed condition in the rotating machine according to one exemplary embodiment. The operating space module receives a design speed limit of a rotating component of a rotating machine 402. For example, the operating space module retrieves the design speed limit of a rotor in a combustion turbine from the memory of the over-speed detector. In such an example, the design speed limit is defined by an operator of the combustion turbine based on legal and physical restrictions for operating the combustion turbine. The operating space module then calculates one or more overshoot values of the rotating component based on a trip overshoot model of the rotating machine 404. The trip overshoot model of the rotating machine is, for example, defined by one or more differential equations that predict the behavior of the rotating component after tripping the rotating machine. The operating space module then determines a boundary representing an NTO space in a speed-acceleration plane based on the design speed limit and the one or more overshoot values 406. For example, the operating space module determines the boundary by subtracting the one or more overshoot values from the design speed limit.

The communication module then receives a speed and an acceleration of the rotating component from a sensor coupled to the rotating machine 408. The determination module then determines whether at least one of the speed and the acceleration of the rotating component exceed the NTO space 410. If at least one of the speed and the acceleration exceed the NTO space, the notification module sends a notification for tripping the rotating machine for preventing an emergency over-speed condition 412.

Figure 5:
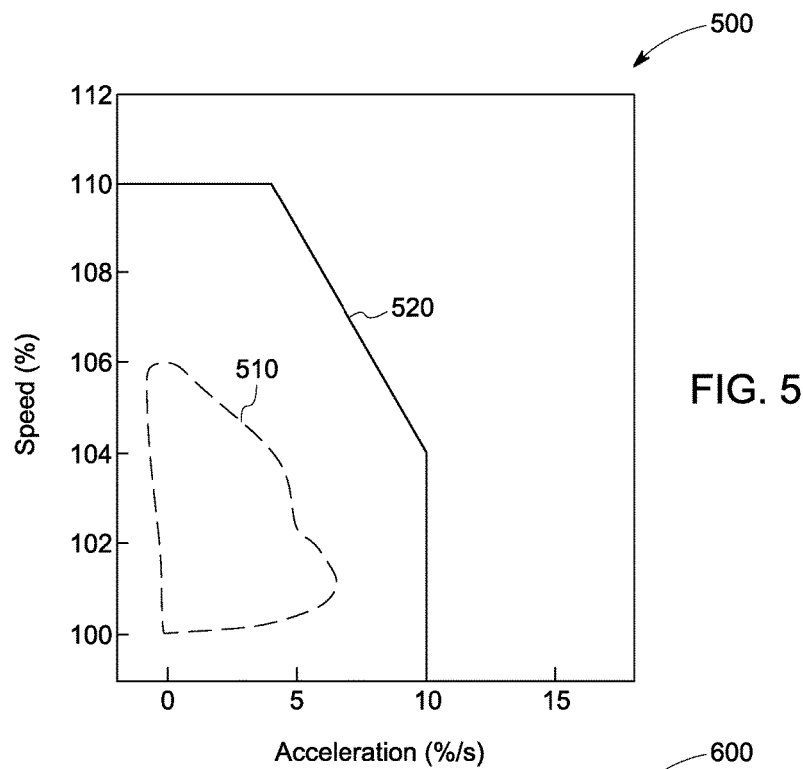
FIG. 5 is a graph illustrating a detection of a non-trip condition in the rotating machine according to one embodiment.

FIG. 5 is a graph 500 illustrating the detection of a non-trip condition in a rotating machine according to one exemplary embodiment. The graph 500 illustrates a speed-acceleration plane in which the y-axis represents the speed of a rotating component in percentages and the x-axis represents the acceleration of the rotating component in percentage per second. In the illustrated embodiment, an operator of the rotating machine defines the design speed limit of the rotating component in the rotating machine as 115%. The operating space module determines the boundary 520 representative of the NTO space based on the design speed limit and the trip overshoot model of the rotating machine. The determination module determines that the speed and the acceleration (represented by the curve 510) of the rotating component never exceeds the NTO space. Thus, in this embodiment, the over-speed detector does not send a notification for tripping the rotating machine.

Figure 6:
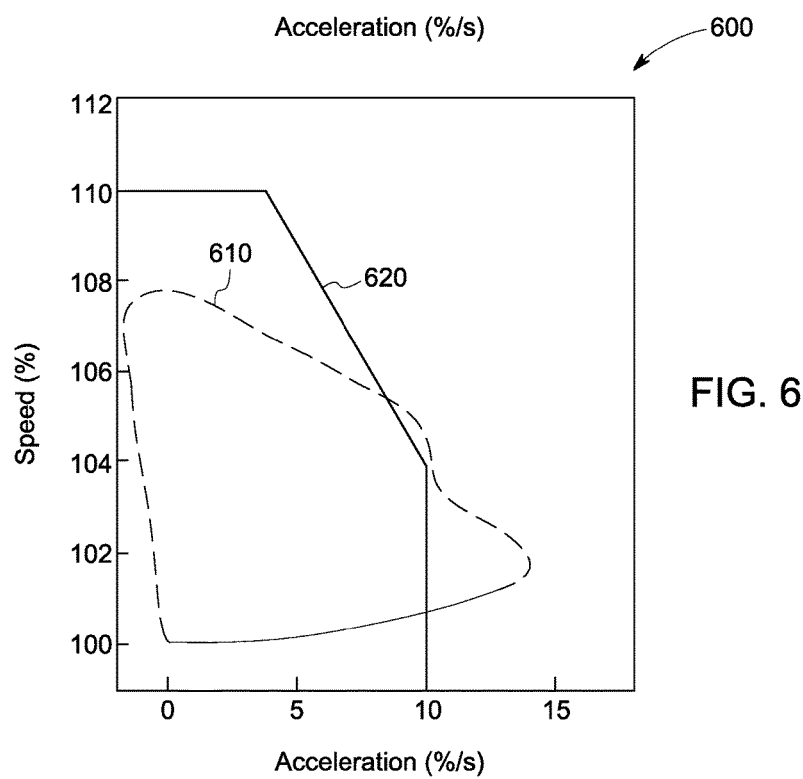
FIG. 6 is a graph illustrating a detection of an emergency over-speed condition in the rotating machine according to one embodiment.

FIG. 6 is a graph 600 illustrating the detection of an emergency over-speed condition in a rotating machine according to one embodiment. The graph 600 illustrates a speed-acceleration plane in which the y-axis represents the speed of a rotating component in percentages and the x-axis represents the acceleration of the rotating component in percentage per second. In the illustrated embodiment, an operator of the rotating machine defines the design speed limit of the rotating component in the rotating machine as 115%. The operating space module determines the boundary 620 representative of the NTO space based on the design speed limit and the trip overshoot model of the rotating machine. The determination module determines that the speed and the acceleration (represented by the solid portion of the curve 610) of the rotating component exceeds the NTO space. Thus, in this embodiment, the over-speed detector sends a notification for tripping the rotating machine. Since the NTO space is determined based on the design speed limit and the trip overshoot model, the above described method of tripping the rotating machine is advantageous as it ensures that the speed of the rotating component (represented by the dashed portion of the curve 610) never overshoots and exceeds the design speed limit.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for preventing an emergency over-speed condition in a rotating machine, the method comprising:

receiving a design speed limit of a rotating component of the rotating machine;

calculating one or more overshoot values of the rotating component based on a trip overshoot model of the rotating machine, wherein the trip overshoot model comprises a grey model combining a black box model based on experimental data with a white box model based on physical laws, and wherein the trip overshoot model is based on a predicted behavior of the rotating machine after tripping the rotating machine, the predicted behavior determined by at least a fuel volume remaining in the rotating machine;

determining a boundary of a non-trip operating (NTO) space by subtracting the one or more overshoot values from the design speed limit of the rotating component;

receiving a speed and an acceleration of the rotating component;

determining whether at least one of the speed or the acceleration of the rotating component exceeds the NTO space in a speed-acceleration plane comprising a first axis representing speed and a second axis representing acceleration, wherein the NTO space is based on the trip overshoot model; and tripping the rotating machine in response to determining that the at least one of the speed or the acceleration of the rotating component exceeds the NTO space.

2. The method of claim 1, further comprising determining the NTO space based on a maximum acceleration threshold.

3. The method of claim 1, further comprising determining the NTO space based on a maximum speed threshold.

4. The method of claim 3, further comprising determining whether the at least one of the speed or the acceleration of the rotating component is within a maximum speed space, wherein the maximum speed space is a region beyond the maximum speed threshold and within the boundary in the speed-acceleration plane.

5. The method of claim 1, wherein the rotating machine is a combustion turbine and the rotating component is a rotor of the combustion turbine.

6. A method for preventing an emergency over-speed condition in a rotating machine, the method comprising:

receiving a design speed limit of a rotating component of the rotating machine;

calculating one or more overshoot values of the rotating component based on a trip overshoot model of the rotating machine, wherein the trip overshoot model comprises a grey model combining a black box model based on experimental data with a white box model based on physical laws, and wherein the trip overshoot model of the rotating machine is based on a predicted behavior of the rotating machine after tripping the rotating machine, the predicted behavior determined by at least a fuel volume remaining in the rotating machine, an inertia of the rotating component, a response time of a fuel valve, and a component efficiency of the rotating machine;

determining a boundary of a non-trip operating (NTO) space by subtracting the one or more overshoot values from the design speed limit of the rotating component;

receiving a speed and an acceleration of the rotating component;

determining whether at least one of the speed or the acceleration of the rotating component exceeds the NTO space in a speed-acceleration plane comprising a first axis representing speed and a second axis representing acceleration, wherein the NTO space is based on the trip overshoot model; and tripping the rotating machine in response to determining that the at least one of the speed or the acceleration of the rotating component exceeds the NTO space.

7. The method of claim 6, wherein the experimental data on which the black box model is based are collected using at least one of a regression analysis or a non-parametric frequency response analysis.

8. A system for preventing an emergency over-speed condition in a rotating machine, the system comprising:

at least one processor;

at least one memory;

an operating space module stored in the at least one memory and executable by the at least one processor, the operating space module configured to receive a design speed limit of a rotating component of the rotating machine, calculate one or more overshoot values of the rotating component based on a trip overshoot model of the rotating machine, and determine a boundary of a non-trip operating (NTO) space by subtracting the one or more overshoot values from the design speed limit of the rotating component, wherein the trip overshoot model comprises a grey model combining a black box model based on experimental data with a white box model based on physical laws, and wherein the trip overshoot model is based on a predicted behavior of the rotating machine after tripping the rotating machine, the predicted behavior determined by at least a fuel volume remaining in the rotating machine;

a communication module stored in the at least one memory and executable by the at least one processor, the communication module configured to receive a speed and an acceleration of the rotating component;

a determination module stored in the at least one memory and executable by the at least one processor, the determination module communicatively coupled to the communication module and configured to determine whether at least one of the speed or the acceleration of the rotating component exceeds the NTO space in a speed-acceleration plane comprising a first axis representing speed and a second axis representing acceleration, wherein the NTO space is based on the trip overshoot model; and a notification module stored in the at least one memory and executable by the at least one processor, the notification module communicatively coupled to the determination module and configured to trip the rotating machine in response to determining that the at least one of the speed or the acceleration of the rotating component exceeds the NTO space.

9. The system of claim 8, wherein the operating space module is further configured to determine the NTO space based on a maximum acceleration threshold.

10. The system of claim 8, wherein the operating space module is further configured to determine the NTO space based on a maximum speed threshold.

11. The system of claim 10, wherein the determination module is further configured to determine whether the at least one of the speed or the acceleration of the rotating component is within a maximum speed space, wherein the maximum speed space is a region beyond the maximum speed threshold and within the boundary in the speed-acceleration plane.

12. The system of claim 8, wherein the rotating machine is a combustion turbine and the rotating component is a rotor of the combustion turbine.

13. The system of claim 12, wherein the predicted behavior of the rotating machine after tripping the rotating machine is further determined based on at least one of an inertia of the rotor, a response time of a fuel valve, or a component efficiency of the combustion turbine.

14. The system of claim 12, wherein the experimental data on which the black box model is based are collected using at least one of a regression analysis or a non-parametric frequency response analysis.

15. The system of claim 8, wherein the predicted behavior of the rotating machine after tripping the rotating machine is further determined based on an inertia of the rotating component, a response time of a fuel valve, and a compressor efficiency of a compressor of the rotating machine.

* * * * *